J. REIF.
SHOCK ABSORBER FOR AUTOMOBILES AND OTHER VEHICLES.
APPLICATION FILED JUNE 1, 1920.
1,399,795.
Patented Dec. 13, 1921.
2 SHEETS—SHEET 1.
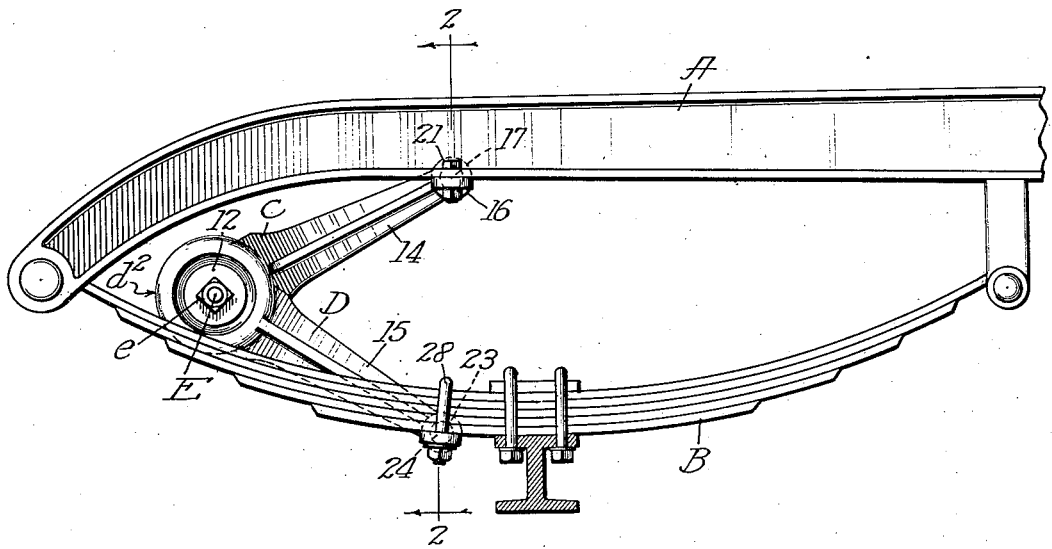
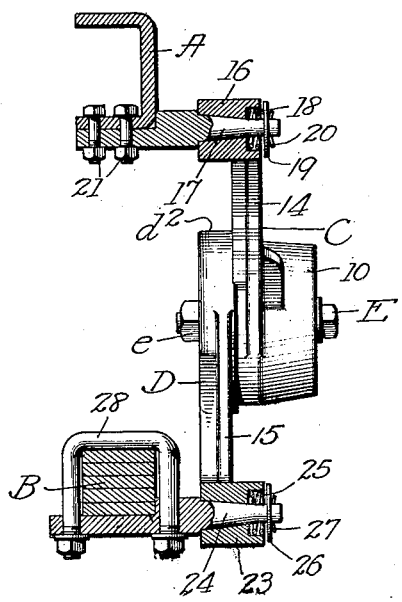

J. REIF.
SHOCK ABSORBER FOR AUTOMOBILES AND OTHER VEHICLES.
APPLICATION FILED JUNE 1, 1920.
1,399,795. Patented Dec. 13, 1921.
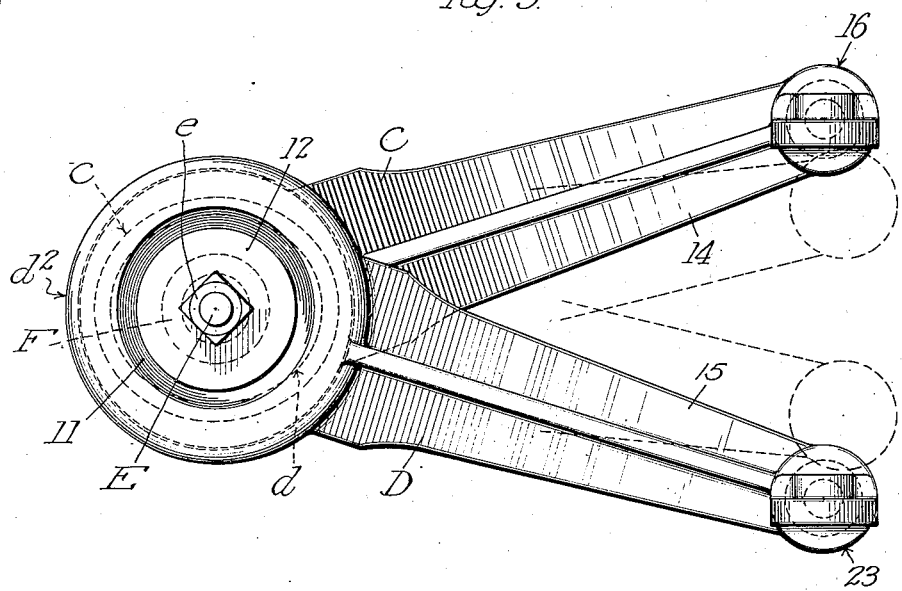
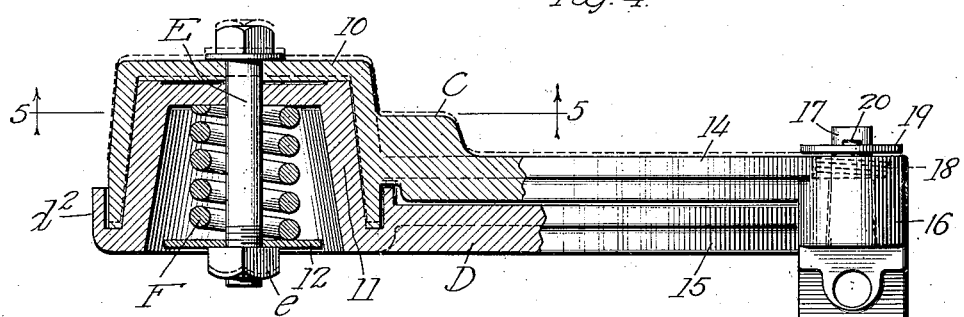
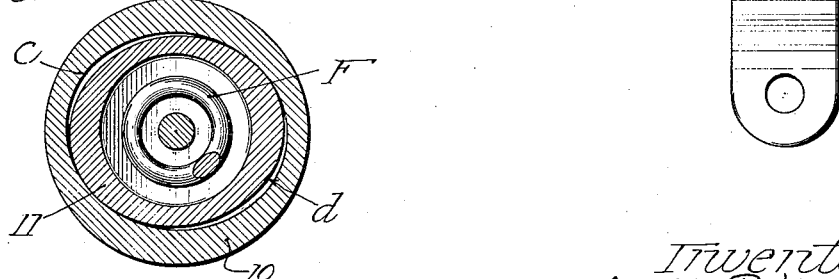

UNITED STATES PATENT OFFICE.

JOSEPH REIF, OF HEBRON, INDIANA, ASSIGNOR OF FORTY-FIVE PER CENT. TO FRANCIS E. LING, OF HEBRON, INDIANA.

SHOCK-ABSORBER FOR AUTOMOBILES AND OTHER VEHICLES.

1,399,795.   Specification of Letters Patent.   Patented Dec. 13, 1921.

Application filed June 1, 1920. Serial No. 385,481.

*To all whom it may concern:*

Be it known that I, JOSEPH REIF, a citizen of the United States, residing at Hebron, county of Porter, and State of Indiana, have invented certain new and useful Improvements in Shock-Absorbers for Automobiles and other Vehicles, of which I do declare the following to be a full, clear, and exact description, reference being had to the accompanying drawings, forming a part of this specification.

The present invention has for its object to provide an improved construction of shock absorber adapted to relieve the occupants of an automobile or like vehicle from the sudden jars or shocks incident to the excessive movement of the vehicle springs. The invention consists in the features of novelty hereinafter described, illustrated in the accompanying drawings and particularly pointed out in the claims at the end of this specification.

Figure 1 is a view in side elevation showing the front portion of an automobile frame and one of its springs with my improved shock absorber connected thereto. Fig. 2 is a view in cross section on line 2—2 of Fig. 1, parts being shown in elevation. Fig. 3 is an enlarged detail view of my shock absorber, the movement of the parts being indicated by dotted lines. Fig. 4 is a view showing my shock absorber, partly in horizontal section and partly in plan. Fig. 5 is a view in vertical section on the line 5—5 of Fig. 4.

In the accompanying drawings, A designates the front portion of part of an automobile frame or chassis and B denotes one of the springs that will be connected to the frame in usual or suitable manner.

In the preferred embodiment of my invention, my improved shock absorber comprises two main parts or members designated by the letters C and D that are connected together by a through bolt E having a head at one end and a threaded nut $e$ at its opposite end. The member C is shown as having one of its ends formed as a hollow cup-shaped cone 10 adapted to receive the cup-shaped chambered cone 11 that is formed on the corresponding end of the member D, the ends of the cones 10 and 11 being perforated to receive the through bolt E. Upon the through bolt E is placed a coil compression spring F one end of which bears against the bottom of the cone 11, while its opposite end bears against a washer 12 that encircles the bolt 11 immediately adjacent the nut $e$, the spring F thus tending to force the cones 10 and 11 into snug engagement. The parts of the members C and D projecting from their respective cones 10 and 11 are preferably in the form of arms 14 and 15. The arm 14 (see Fig. 2) is shown as provided at its free end with a socket 16 through which passes the conical end of a bar 17. Preferably, the socket 16 is chambered on its outer face to receive a coil spring 18 against which bears a washer 19 that is held in place by a cotter pin 20 passing through the end of the bar 17. The opposite end of the bar 17 is suitably bolted as at 21 to the frame A. Similarly, the free end of the arm 15 is formed with a socket 23 to receive the conical end of a bar 24, the outer face of the socket 23 being chambered to receive a coil spring 25 against which bears the washer 26 held in place by the cotter pin 27 passing through the end of the bar 24. The bar 24 is shown as connected to the spring B by means of the loop 28.

By reference to Figs. 3 and 5 of the drawings, it will be seen that the bearing or engaging surfaces of the cones 10 and 11 are cam-shaped and preferably these engaging surfaces are both elliptical and conical. The precise form of the cam-shaped engaging surfaces of the members C and D may be varied without departing from the spirit of the invention. The purpose of the invention is to have the cam-shaped engaging surfaces of the members C and D so disposed that during the normal condition of the vehicle spring the members can revolve with respect to each other without offering material resistance to the action of the vehicle spring, but when excessive movement of the spring occurs (incident to the car passing over unusual obstructions) the cam-shaped engaging surfaces of the members C and D will tend to produce a movement of these parts C and D at an angle to their axis of revolution and in so doing, will be opposed by the coil spring F. As shown, the cam-shaped engaging surface $d$ of the cone 11 is preferably elliptical, its major axis extending (when the parts are in the inactive position shown in Fig. 3) at an angle to the major axis of the elliptical cam-shaped engaging surface $c$ on the interior of the member C, but the surfaces $c$ and $d$ are at such time so relatively disposed that the normal compression of the vehicle spring B incident to slight obstructions, will not cause any severe thrust of the surface $d$ against the surface $c$. When, however, the members C and D are subjected to excessive strain tending to force them toward each other, the major axis of the cone 11 will be moved toward the minor axis of the cone 10 and in so doing, the conical and elliptical engaging surface $d$ riding upon the corresponding surface $c$ of the cone 10 will tend to move the cone 11 outwardly in the cone 10. This movement, however, will be opposed by the coil spring F which will relieve any violence of shock incident to the movement of the vehicle spring; and the spring F will aid in restoring the parts C and D to normal position when the excessive strain thereon is relieved. So, also, by reference to Figs. 3 and 5, it will be seen that when the arms 14 and 15 of the members C and D are spread toward the limit of their movement, the major axis of the engaging surface $d$ of the cone 11 will be moved toward the minor axis of the engaging surface $c$ of the member C, thus tending to cause the cone $d$ to move outwardly in the cone 10, but this relative movement of the cones 10 and 11 at right angles to their axis of rotation will be resisted by the coil spring F. The tension of the spring F can be regulated as desired by the nut $e$ on the bolt E.

Preferably, the rim $d^2$ is formed about the cone 11 to receive the outer portion of the cone 10, thus serving as a guard to retain the lubricant and prevent the access of dust to the engaging surfaces of the cones.

So far as I am aware, my invention presents the first instance of a shock absorber comprising a pair of relatively revoluble members having cam-shaped engaging surfaces, these members being provided with means for attaching them to relatively movable parts of the vehicle and being provided with a spring tending to oppose the movements of the members at an angle to their plane of revolution under excessive strains.

Having thus described my invention, what I claim as new and desire to secure by Letters Patent is:—

1. A shock absorber comprising a pair of relatively revoluble members arranged substantially one within the other and having the cam-shaped outer wall of the inner member engaging the cam-shaped inner wall of the outer member, a connector united to each of said members for attaching it to the vehicle, and a spring connected to said members and adapted to oppose their relative movement at an angle to their plane of revolution.

2. A shock absorber comprising a pair of relatively revoluble members arranged substantially one within the other and having the cam-shaped outer wall of the inner member engaging the cam-shaped inner wall of the outer member, a connector united to each of said members for attaching it to the vehicle, a bolt extending through said members, and a spring mounted upon said bolt and adapted to oppose the relative movement of the members at an angle to their plane of revolution.

3. A shock absorber comprising a pair of relatively revoluble members arranged substantially one within the other and having the cam-shaped outer wall of the inner member engaging the cam-shaped inner wall of the outer member, a connector united to each of said members for attaching it to the vehicle, a bolt extending through said members, a spring connected to said members and adapted to oppose their relative movement at an angle to their plane of revolution, and means for adjusting said spring.

4. A shock absorber comprising a pair of relatively revoluble members arranged substantially one within the other and having the cam-shaped outer wall of the inner member engaging the cam-shaped inner wall of the outer member, an arm united to each of said members and provided at its free end with means for pivotally connecting it to a part of the vehicle, and a spring connected to said members and adapted to oppose their relative movement at an angle to their plane of revolution.

5. A shock absorber comprising a pair of hollow cones arranged substantially one within the other and having the cam-shaped outer wall of the inner cone engaging the cam-shaped inner wall of the outer cone, a bolt connecting said cones, a spring mounted upon said bolt, and means whereby said cones may be connected to relatively movable parts of the vehicle.

6. A shock absorber comprising a pair of hollow cones arranged substantially one within the other and having the cam-shaped outer wall of the inner cone engaging the cam-shaped inner wall of the outer cone, a bolt passing through the ends of said cones, a spring mounted upon said bolt, a nut for adjusting said spring also mounted upon said bolt, and arms whereby said cones may be connected to relatively movable parts of the vehicle.

7. A shock absorber comprising a pair of inner and outer cones each open at one end and closed at its opposite end, the inner cone being chambered, a bolt passing through the ends of said cones, a coil spring arranged within the chamber of the inner cone and encircling said bolt, an adjusting nut upon said bolt, and arms united to said cones for connecting them respectively to relatively movable parts of the vehicle.

8. A shock absorber comprising a pair of inner and outer cones, the inner cone being provided with a reverted rim and the edge of the outer cone being arranged between said inner cone and said reverted rim, said cones having cam-shaped engaging surfaces, a bolt passing through the ends of said cones, a spring mounted upon said bolt, and arms connected to said cones whereby they may be attached to relatively movable parts of the vehicle.

9. A shock absorbed comprising a pair of relatively revoluble members having cam-shaped engaging surfaces, a connector united to each of said members for attaching it to the vehicle, and a spring connected to said members and adapted to oppose their relative movement at an angle to their plane of revolution, the engaging surfaces of said members being inoperative during normal movement of the vehicle spring but engaging to oppose abnormal movement thereof.

JOSEPH REIF.